2,351,201

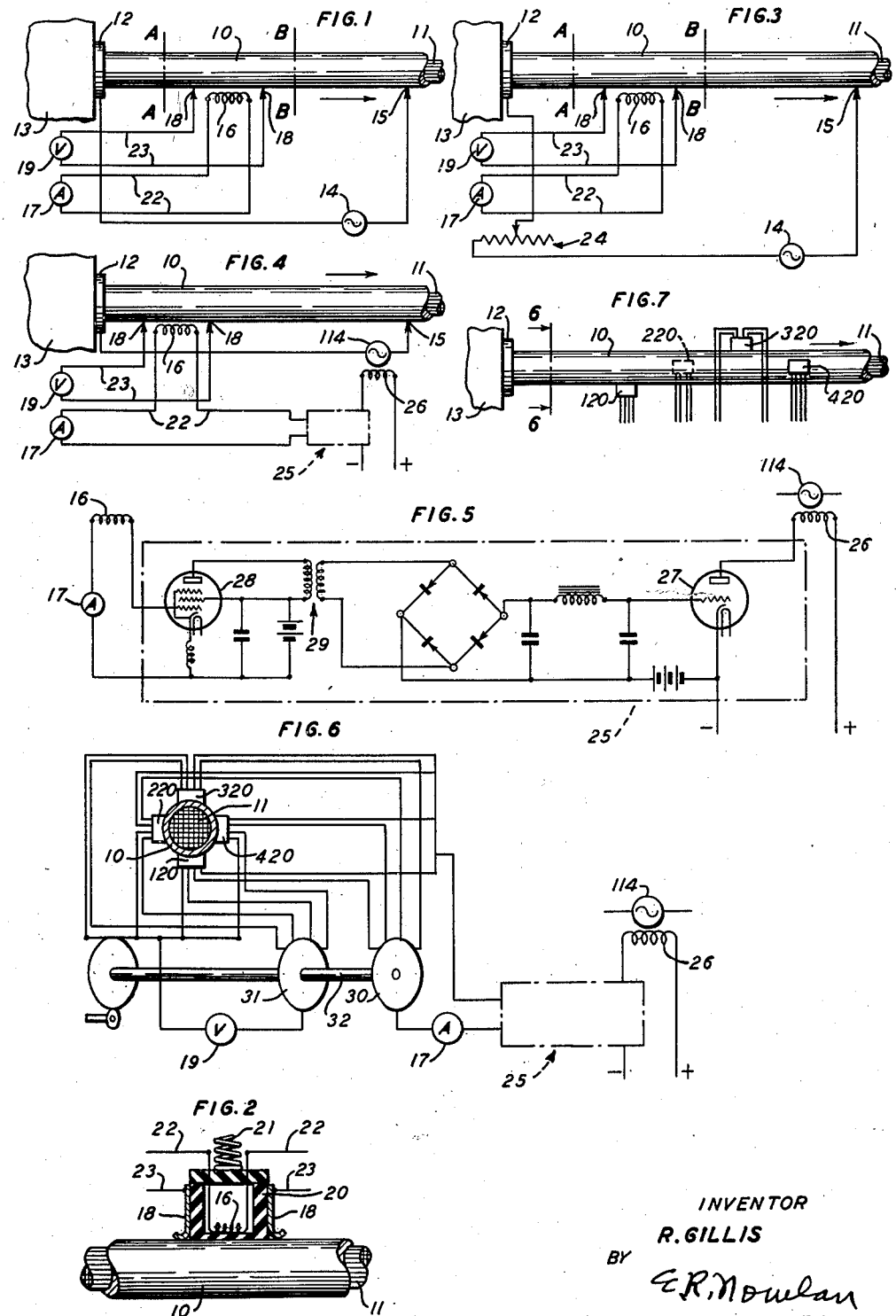
June 13, 1944. R. GILLIS 2,351,201
METHOD OF AND MEANS FOR MEASURING
Filed July 16, 1942
INVENTOR
R. GILLIS
BY
ATTORNEY Patented June 13, 1944

UNITED STATES PATENT OFFICE 2,351,201

METHOD OF AND MEANS FOR MEASURING

Randall Gillis, Westfield, N. J., assignor to Western Electric Company, Incorporated, New York, N. Y., a corporation of New York Application July 16, 1942, Serial No. 451,238

14 Claims. (Cl. 175—183)

This invention relates to a method of and means for measuring, and more particularly to a method of and means for measuring the thickness of metallic sheet material of which only one surface is conveniently or possibly accessible.

In many instances electrical conductor cables are provided with an external protective sheath of lead or lead alloy, extruded over the core to be continuously seamless both circumferentially and longitudinally. It is highly desirable to be able to measure the thickness of this sheath as it is being extruded into place, in order to detect variations from uniformity of its thickness both along the length of the cable and circumferentially around it. Obviously, only the exterior surface of what is a seamless tube or cylindrical sheet of lead or lead alloy is mechanically accessible to any device to be used in making such measurements. Other instances may occur in other arts also where it is desired to measure the thickness of a metal sheet, which need not necessarily be a tube in form, but of which only one face may be readily accessible.

One object of the present invention is to provide an improved method of and means for measuring the thickness of a metal sheet of which only one face is conveniently accessible, in a rapid, reliable and simple manner.

With the above and other objects in view, the invention in its simplest form may be embodied in steps of and combined separate means for passing an alternating current through a portion of the sheet between two points thereof, measuring the voltage drop between two other points of the sheet which are between the first named two points, and measuring the amperage in the plate between the second named two points, the ratio of the measured voltage to the measured amperage being then inversely proportional to and so a measure of the thickness of the sheet between the two second named points.

Other objects and features of the invention will appear from the following detailed description of embodiments thereof taken in connection with the accompanying drawing in which the same reference numerals are applied to identical parts in the several figures, and in which Fig. 1 is a diagrammatic representation in side elevation of an apparatus constructed in accordance with the invention in its simplest form and applied to the measurement of the thickness of a metal sheath being extruded over a cable core;

Fig. 2 is a diagrammatic representation on an enlarged scale of a pickup coil and contacts device suitable for use in the apparatus of Fig. 1;

Fig. 3 is a view similar to Fig. 1 of an amplified form of the apparatus;

Fig. 4 is a view similar to Fig. 1 of a further amplified form of the apparatus;

Fig. 5 is a diagram of one of the elements not detailed in Fig. 4;

Fig. 6 is a view similar to Fig. 1, but at right angles thereto, of a still more amplified form of the apparatus; and Fig. 7 is a partial side view of the showing of Fig. 6.

In Fig. 1 is shown an apparatus for measuring the thickness of a metal sheath 10 being extruded upon a cable core 11 by an extrusion press having an extrusion die 12 mounted in an extrusion cylinder 13. The sheathed cable emerges from the die 12 in the direction indicated by the arrow and the purpose of the invention is to measure the thickness of the sheath. It is presupposed that the sheath 10 is fully electrically insulated from electrical conductors contained in the core 11.

An alternating current generator 14 is connected to cause current to flow through the sheath 10 longitudinally thereof between points sufficiently far apart so that over some relatively small section thereof, the current is distributed circumferentially of the sheath as uniformly as the substance and thickness of the sheath will permit. Let it be assumed that the current from the generator 14 is brought to the sheath, as shown in Fig. 1, by connecting one side of the generator to the die 12, as a convenient sliding contact, and the other side to some other suitable sliding contact 15 riding against the sheath at some distance from the die. This distance being sufficiently great, there will be somewhere between the die 12 and the contact 15, a section of the sheath, say between the cross-sections indicated by the section lines A—A and B—B, where the current flow in the sheath is distributed circumferentially of the sheath as determined by the substance and thickness of the sheath. Hence there will be an electromagnetic field analogously distributed around the sheath between A—A and B—B.

A small pickup coil 16 is applied closely to, though insulated from, the outer face of the sheath at a convenient point between A—A and B—B, and is connected to some suitable current measuring device 17 such as an ammeter, milliammeter or the like. At the same time two sliding pickup contacts 18, 18 are applied to the outer face of the sheath, one at each end of the coil 16 and preferably as close as practicable thereto while suitably insulated therefrom. A small housing 20 of insulating material containing the coil 16 internally and supporting the contacts 18 externally may be conveniently held against the cable sliding by, by means of a spring 21, the coil being connected to the ammeter by leads 22, 22 and the contacts 18 being connected to a voltmeter 19 or other suitable potential measuring device by leads 23, 23.

The A. C. voltage applied by the generator 14 between the die 12 and the contact 15 being assumed to be constant, the steady state of the current flowing under the housing 20, i. e. between the contacts 18, 18, will be varied only by the resistance of the portion of the sheath between the contacts 18, 18. Since the material of the sheath is substantially homogeneous, this resistance is inversely proportional to the thickness of the sheath portion between the contacts. This resistance is measured by the ratio of the voltage between the contacts 18 to the current volume between these contacts. Hence the thickness of the sheath under the casing 20 is given directly in any desired units by the ratio of the voltage to the amperage, as shown by the devices 19 and 17, multiplied by a calibration constant.

As further developed in Fig. 3, means such as an adjustable rheostat, resistance or impedance 24 is provided to vary the voltage applied between the die 12 and the contact 15. In the arrangement of Fig. 1 the amperage recorded by the device 17 will diminish when the thickness of metal under the coil 16 diminishes and vice versa. Hence both devices 17 and 19 must be read and their ratio taken to measure the thickness. But, if the current under the coil 16 be kept constant and hence the reading of the device 17 be held constant, this reading can be absorbed into the calibration constant and only the device 19 need be read to determine the thickness directly. Hence with a device such as the rheostat 24 in the circuit, this rheostat is manipulated until the device 17 shows a particular predetermined value; and if the device 19 be then read at the same moment, this last reading may be arranged to give the metal thickness directly by correctly calibrating the scale of the device 19.

A still further step forward, as shown in Figs. 4 and 5, is to replace the manually adjustable regulating device 24 of Fig. 3 by an automatic means, generally indicated at 25 in Fig. 4 and diagrammed in essential details in Fig. 5, which is controlled and actuated by the current in the pickup coil 16 to control the input voltage at 12 and 15 in such fashion as to keep the current under the coil 16 and therefore also the current in the coil 16, substantially constant. The scale of the device 19 may then be calibrated to read metal thickness directly; and no manipulation of any part of the apparatus, nor any calculation, will be needed in determining the metal thickness under the casing 20 at any time during the extrusion. In fact, if the device 19 be in the nature of a recording voltmeter, a continuous record or graph may be obtained showing both thickness and variations of thickness along any one longitudinal line of the cable sheath. The particular nature, structure and mode of operation of the device or arrangement 25 are no part of the present invention. There are various such, commercially available, capable of effecting the desired result. For completeness of disclosure, the essentials of one arrangement for effecting the desired result are disclosed in Fig. 5.

The A. C. generator 114 which supplies A. C. current to the die 12 and contact 15, has a separately excited field coil 26 to which D. C. current of constant potential is supplied from any suitable source not shown. A vacuum triode valve tube 27 has its plate circuit connected in the negative lead to the field coil 26 with the plate nearest the coil. At the other end of the arrangement 25, the A. C. current from the coil 16 is fed to the grid circuit of a high gain amplifying pentode vacuum tube 28, the amplified current is picked up in a transformer 29, passed through a copper oxide disc rectifying network and fed to the grid circuit of the triode 27. Thus when the current picked up in the coil 16 rises above the predetermined constant calibration value, the grid of the triode 27 is biased to cut down the voltage in the field coil 26 of the generator 114 and thus the voltage across 12 and 15 is diminished. In like manner, if the current in the coil 16 falls below the calibration value, the voltage across 12 and 15 is correspondingly increased. The current in the coil 16 thus controls the current in the coil 26 to keep the current in the coil 16 constant automatically.

In the arrangement disclosed in Figs. 6 and 7, four pickup devices, 120, 220, 320 and 420 respectively, each identically like the casing 20, coil 16 and contacts 18 as shown in Fig. 2, are arranged in a helical array about the sheath 11, ninety degrees (90°) apart. The leads of the four pickup coils are connected through a rotary commutator switch 30 to the current indicating device 17 and the control device 25, while the leads from the four pairs of voltage pickup contacts are connected through another rotary commutator switch 31 to the thickness indicator 19. The two switches 30 and 31 are driven synchronously, e. g. by being mounted on a common shaft 32 driven by any suitable means not shown. The various connections are so made that each pickup coil and its associated pickup contacts are simultaneously connected in turn respectively to the device 25 and the device 19. Preferably the speed of the shaft 32 and the longitudinal spacing of the four pickup units along the sheath are so related to the advance of the cable past the pickup units, that the four measurements made during each cycle of operation refer to points ninety degrees (90°) apart on one and the same transverse plane section of the sheath. By adjusting the variables involved appropriately, sets of measurements of sheath thickness at the four ends of two intersecting mutually perpendicular diameters of the sheath can be made at intervals as close as may be reasonably desired. Obviously the number of pickup units employed may be increased or diminished as desired. With the arrangement of Figs. 6 and 7, not only can variations of thickness longitudinally of the sheath be detected and measured but also variations circumferentially of the sheath, as well as the actual thicknesses at a sufficient number of points sufficiently distributed to give close and accurate control of the sheathing process.

The arrangement shown in Fig. 4 is particularly convenient and useful, since the thickness measure is substantially a pure linear function of the measured voltage, and so a single constant conversion factor for a given metal or alloy constituting the sheet in question, will convert a voltage reading into a thickness measurement.

The particular arrangements disclosed as embodiments of the invention are illustrative and may well be variously modified and altered within the scope of the invention as particularly pointed out in the appended claims.

What is claimed is:

1. The method of measuring the thickness of a sheet of metal which comprises steps of passing an alternating electric current through a portion of the sheet between two points thereof relatively far apart, measuring the voltage between two other points which are between the first named points and relatively close together, and measuring the amperage of current flowing between the two second named points, the thickness measure of the sheet being then a linear function of the ratio of the measured voltage to the measured amperage.

2. The method of measuring the thickness of a sheet of metal which comprises steps of passing an alternating electric current through a portion of the sheet between two points thereof relatively far apart, measuring the voltage between two other points which are between the first named points and relatively close together, measuring the amperage of current flowing between the two second named points, and varying the originally introduced current to bring the measured amperage to a predetermined constant calibration value, the thickness measure of the sheet being then a linear function of the measured voltage.

3. The method of measuring the thickness of a sheet of metal which comprises steps of passing an alternating electric current through a portion of the sheet between two points thereof relatively far apart, measuring the voltage between two other points which are between the first named points and relatively close together, picking up inductively a current from the current flowing between the two second named points, and controlling the originally introduced current by the picked up current to bring the picked up current to a predetermined constant calibration value, the thickness measure of the sheet being then a linear function of the measured voltage.

4. Apparatus for measuring the thickness of a sheet of metal which comprises means to pass an alternating electric current through a portion of the sheet between two points thereof relatively far apart, means to measure the voltage between two other points which are between the first named points and relatively close together, and means to measure the amperage of current flowing between the two second named points, the thickness measure of the sheet being then a linear function of the ratio of the measured voltage to the measured amperage.

5. Apparatus for measuring the thickness of a sheet of metal which comprises means to pass an alternating electric current through a portion of the sheet between two points thereof relatively far apart, means to measure the voltage between two other points which are between the first named points and relatively close together, means to measure the amperage of current flowing between the two second named points, and means to vary the originally introduced current to bring the measured amperage to a predetermined constant calibration value, the thickness measure of the sheet being then a linear function of the measured voltage.

6. Apparatus for measuring the thickness of a sheet of metal which comprises means to pass an alternating electric current through a portion of the sheet between two points thereof relatively far apart, means to measure the voltage between two other points which are between the first named points and relatively close together, means to pick up inductively a current from the current flowing between the two second named points, and means to control the originally introduced current by the picked up current to bring the picked up current to a predetermined constant calibration value, the thickness measure of the sheet being then a linear function of the measured voltage.

7. Apparatus for measuring the thickness of a sheet of metal which comprises means to pass an alternating electric current through a portion of the sheet between two points thereof relatively far apart, a pair of contacts to pick up the potentials of two other points relatively close together and between the two first named points, a device connected to the pair of contacts to measure the voltage between them, a coil between the two contacts to have a current generated therein inductively by the current flowing in the sheet between the two said contacts, and a device connected to the coil to measure the amperage of the current induced therein, the thickness measure of the sheet being then a linear function of the ratio of the measured voltage.

8. Apparatus for measuring the thickness of a sheet of metal which comprises means to pass an alternating electric current through a portion of the sheet between two points thereof relatively far apart, a pair of contacts to pick up the potentials of two other points relatively close together and between the two first named points, a device connected to the pair of contacts to measure the voltage between them, a coil between the two contacts to have a current generated therein inductively by the current flowing in the sheet between the two said contacts, a device connected to the coil to measure the amperage of the current induced therein, and means in the circuit by which the original current is brought to the first named two points to vary the original current to bring the measured amperage of the current in the coil to a predetermined constant calibration value, the thickness measure of the sheet being then a linear function of the measured voltage.

9. Apparatus for measuring the thickness of a sheet of metal which comprises means to pass an alternating electric current through a portion of the sheet between two points thereof relatively far apart, a pair of contacts to pick up the potentials of two other points relatively close together and between the two first named points, a device connected to the pair of contacts to measure the voltage between them, a coil between the two contacts to have a current generated therein inductively by the current flowing in the sheet between the two said contacts, a device connected to the coil to measure the amperage of the current induced therein, and an adjustable resistance in the circuit by which the original current is brought to the first named two points to vary the original current to bring the measured amperage of the current in the coil to a predetermined constant calibration value, the thickness measure of the sheet being then a linear function of the measured voltage.

10. Apparatus for measuring the thickness of a sheet of metal which comprises means to pass an alternating electric current through a portion of the sheet between two points thereof relatively far apart, a pair of contacts to pick up the potentials of two other points relatively close together and between the two first named points, a device connected to the pair of contacts to measure the voltage between them, a coil between the two contacts to have a current generated therein inductively by the current flowing in the sheet between the two said contacts, a device connected to the coil to measure the amperage of the current induced therein, and an adjustable impedance in the circuit by which the original current is brought to the first named two points to vary the original current to bring the measured amperage of the current in the coil to a predetermined constant calibration value, the thickness measure of the sheet being then a linear function of the measured voltage.

11. Apparatus for measuring the thickness of a sheet of metal which comprises a separately excited generator to pass an alternating electric current through a portion of the sheet between two points thereof relatively far apart, a pair of contacts to pick up the potentials of two other points relatively close together and between the two first named points, a device connected to the pair of contacts to measure the voltage between them, a coil between the two contacts to have a current generated therein inductively by the current flowing in the sheet between the two said contacts, and means in the field circuit of the generator controlled by the induced current in the coil to make the said induced current have a predetermined constant calibration value, the thickness measure of the sheet being then a linear function of the measured voltage.

12. Apparatus for measuring the thickness of a sheet of metal which comprises a separately excited generator to pass an alternating electric current through a portion of the sheet between two points thereof relatively far apart, a pair of contacts to pick up the potentials of two other points relatively close together and between the two first named points, a device connected to the pair of contacts to measure the voltage between them, a coil between the two contacts to have a current generated therein inductively by the current flowing in the sheet between the two said contacts, and vacuum tube means in the field circuit of the generator controlled by the induced current in the coil to make the said induced current have a predetermined constant calibration value, the thickness measure of the sheet being then a linear function of the measured voltage.

13. Apparatus for measuring the thickness of a sheet of metal which comprises a separately excited generator to pass an alternating electric current through a portion of the sheet between two points thereof relatively far apart, a pair of contacts to pick up the potentials of two other points relatively close together and between the two first named points, a device connected to the pair of contacts to measure the voltage between them, a coil between the two contacts to have a current generated therein inductively by the current flowing in the sheet between the two said contacts, means to amplify and rectify the current induced in the coil, and means in the field circuit of the generator controlled by the amplified and rectified current from the coil to make the said amplified and rectified current have a predetermined constant calibration value, the thickness measure of the sheet being then a linear function of the measured voltage.

14. Apparatus for measuring the thickness of a sheet of metal which comprises a separately excited generator to pass an alternating electric current through a portion of the sheet between two points thereof relatively far apart, a pair of contacts to pick up the potentials of two other points relatively close together and between the two first named points, a device connected to the pair of contacts to measure the voltage between them, a coil between the two contacts to have a current generated therein inductively by the current flowing in the sheet between the two said contacts, means to amplify and rectify the current induced in the coil, and vacuum tube means in the field circuit of the generator controlled by the amplified and rectified current from the coil to make the said amplified and rectified current have a predetermined constant calibration value, the thickness measure of the sheet being then a linear function of the measured voltage.

RANDALL GILLIS.